Jan. 1, 1924
L. C. EDWARDS
CUTTER CLEANER FOR FOOD CHOPPERS
Filed March 8, 1923
1,479,175
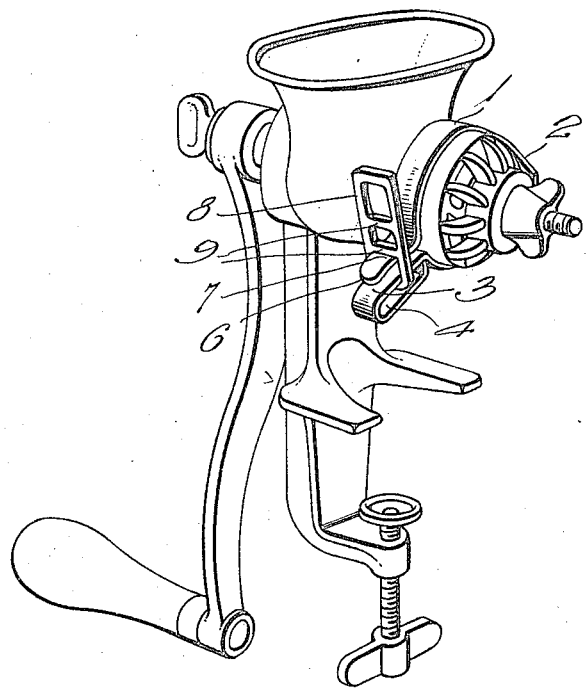
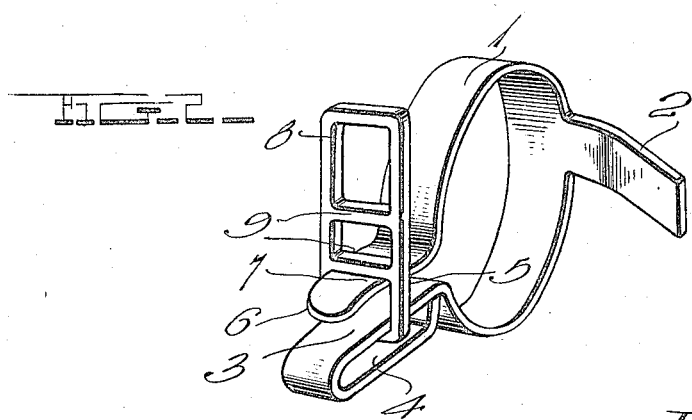
Inventor
L. C. Edwards
Witness
H. Woodard
By Attorneys Patented Jan. 1, 1924.

1,479,175

UNITED STATES PATENT OFFICE.

LOUIS C. EDWARDS, OF ELLINGTON, CONNECTICUT.

CUTTER CLEANER FOR FOOD CHOPPERS.

Application filed March 8, 1923. Serial No. 623,766.

*To all whom it may concern:*

Be it known that I, LOUIS C. EDWARDS, a citizen of the United States, residing at Ellington, in the county of Tolland and State of Connecticut, have invented certain new and useful Improvements in Cutter Cleaners for Food Choppers; and I do declare the following to be a full, clear, and exact description of the invention, such as will enable others skilled in the art to which it appertains to make and use the same.

My invention has for its principal object to provide a simple and inexpensive device which may be easily attached to an ordinary food chopper for the purpose of cleaning the food from the chopping knife.

A further object is to provide a device of the character set forth which is readily adjustable to fit different sizes of choppers.

With the foregoing in view, the invention resides in the novel subject matter hereinafter described and claimed, the description being supplemented by the accompanying drawing.

Figure 1 is a perspective view showing the application of my invention to a food chopper.

Figure 2 is a perspective view of the cleaning attachment.

In the drawing above briefly described, the numeral 1 designates a transversely split metal band adapted to be secured around the delivery end of an ordinary food chopper, one edge of said band being provided with an outwardly extending rigid finger 2 which extends obliquely toward the axis of the band for the purpose of engaging the outer side of the cutter of the food chopper, thereby serving to prevent excessive accumulation of food upon this cutter, as it is being chopped.

In the preferred form of construction, one end of the band 1 is extended radially outward as indicated at 3 and is bent upon itself to provide a radially disposed loop 4 in which one end of an elongated link 5 is slidably and pivotally received. The other end of the band 1 is extended outwardly into substantially parallel relation with the end 3, as indicated by the reference numeral 6 and this end 6 is preferably curved in the manner shown to provide a cam 7 over which the link 5 is forced to contract the band 1 around the chopper and hold it in contracted position. When applying and removing the link 5, this link slides within the loop 4 and when said link is entirely disengaged from the band end 6, it is held by said loop to prevent accidental loss.

The link 5 in the preferred form of construction, is provided with parallel side bars 8 connected by a plurality of transverse bars 9, any one of which may be engaged with the band end 6, according to the size of the meat chopper to which the device is to be attached.

By employing the construction shown or a substantial equivalent thereof, a device is provided which will be simple and inexpensive, may be quickly and easily attached, and will be highly desirable for the purpose intended.

As excellent results have been obtained from the details disclosed, these details are preferably followed. However, within the scope of the invention as claimed, numerous minor changes may be made.

I claim:

1. A cleaner for the rotary cutter of a food chopper, comprising a cleaning finger adapted for co-action with the periphery of the cutter, and a carrying band for said finger, said band being transversely split and adapted to surround the discharge neck of the chopper, the ends of the band being extended laterally in spaced parallelism, and a link carried by one of said ends, the other end being shaped to provide a cam over which a portion of the link is drawn to contract the band around said discharge neck.

2. A cleaner attachment for the discharge neck of a food chopper comprising a transversely split band adapted to surround said discharge neck, the ends of said band being directed laterally into spaced parallelism and one end being bent upon itself to form an elongated loop, the other end of the band being bent toward said loop to provide a cam, an arcuate integral cleaning finger carried by said band and adapted for co-action with the cutter, and a connecting link carried by said loop, said link having spaced cross bars adapted to be selectively engaged with said cam to contract the band around the discharge neck.

In testimony whereof I have hereunto affixed my signature.

LOUIS C. EDWARDS.